(12) United States Patent
Ashokan et al.

(10) Patent No.: US 9,645,862 B2
(45) Date of Patent: May 9, 2017

(54) COMPUTING CONSUMPTION OF APPLICATION PROGRAMMING INTERFACES

(71) Applicant: SAP SE, Waldorf (DE)

(72) Inventors: Chandan Vairavan Ashokan, Bangalore (IN); Balakrishna Gottipati, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/849,055

(22) Filed: Sep. 9, 2015

(65) Prior Publication Data

US 2017/0068577 A1   Mar. 9, 2017

(51) Int. Cl.
*G06F 9/54* (2006.01)
*G06Q 20/08* (2012.01)

(52) U.S. Cl.
CPC ............. *G06F 9/54* (2013.01); *G06Q 20/085* (2013.01)

(58) Field of Classification Search
None
See application file for complete search history.

(56) References Cited

U.S. PATENT DOCUMENTS

| | | | |
|---|---|---|---|
| 2008/0209451 A1* | 8/2008 | Michels | G06F 15/16 719/328 |
| 2011/0251921 A1* | 10/2011 | Kassaei | G06Q 20/14 705/26.41 |
| 2012/0072307 A1* | 3/2012 | Kassaei | G06Q 30/0613 705/26.41 |

* cited by examiner

*Primary Examiner* — Syed Roni

(57) ABSTRACT

Various embodiments of systems and methods for computing consumption of application programming interfaces (APIs) are described herein. Initially at an integration agent, a subscription request is received from an API management system for subscribing to an API product. Next at the integration agent, a consumption policy associated with the subscribed API product is determined, from a plurality of consumption policies received from the API management system, wherein the consumption policy includes a plurality of pre-defined policies mapped with a plurality of API consumption plans. Next at the integration agent, an API consumption plan associated with the determined consumption policy, from the plurality of API consumption plans stored in an API consumption plan store is identified. Finally at the integration agent, a consumption data for the subscribed plurality of API product is computed based on the identified API consumption plan.

16 Claims, 7 Drawing Sheets

COMPUTING CONSUMPTION OF APPLICATION PROGRAMMING INTERFACES

FIELD

Embodiments generally relate to computer systems, and more particularly to data processing systems and methods that facilitate requests or calls from one or more application programs.

BACKGROUND

Computer software, including software programs, software products, etc., is ubiquitous in the present time. Software programs may include several Application Programming Interfaces (APIs) to define communication between different software components. During creation of a software program, a software developer may either create the APIs required for the program or use pre-existing APIs.

Currently, there are several APIs vendor systems that allow software developers to download existing APIs for their programs. After a download of an API, an API vendor system may need to bill the downloading customer, e.g., according to the API usage. There are enterprise systems that allow billing based on usage. However, such enterprise systems are not readily connected to API vendor systems to allow utilization of different functionalities provided by the enterprise systems, including bill generation.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for computing consumption of application programming interfaces (APIs) are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one or more embodiments. Thus, the appearances of these phrases in various places throughout this specification are not necessarily all referring to the same embodiment. Furthermore, the particular features, structures, or characteristics may be combined in any suitable manner in one or more embodiments.

Enterprise systems facilitate execution of work processes in an organization. The enterprise systems are either installed on on-premise servers or on-demand servers or both. The on-demand enterprise systems may also termed as cloud based enterprise systems which may include software as a service (SaaS) enterprise systems, platform as a service (PaaS) enterprise systems, and infrastructure as a service (IaaS) enterprise systems.

Figure 1:
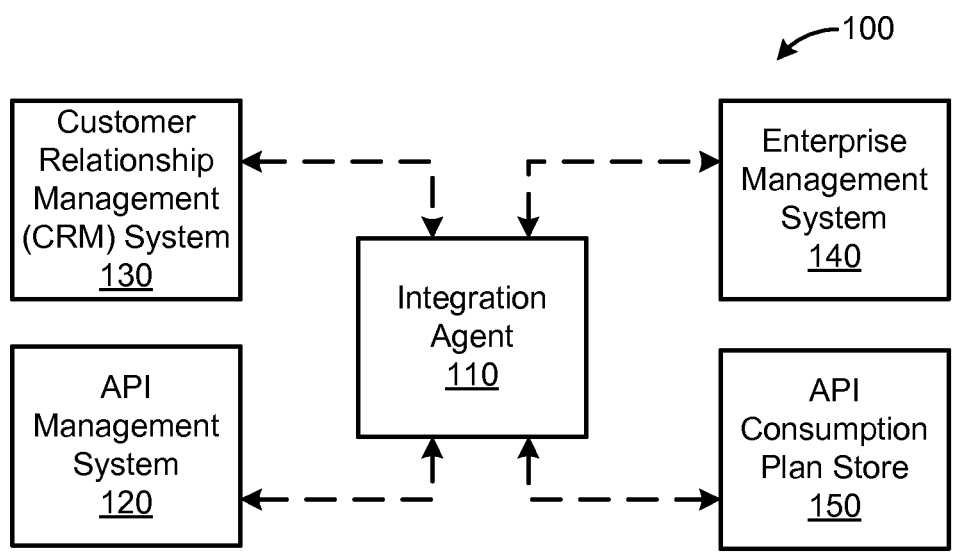
FIG. 1 is a block diagram illustrating a system for computing consumption of APIs, according to one embodiment.

FIG. 1 is a block diagram illustrating system 100 for computing consumption of APIs, according to an embodiment. API management system 120 hosts and manages digital assets such as APIs and API products. An API product may be created by associating a plurality of APIs to address a work process. The API management system 120 may also enable delivery of API related contents to users such as subscribers and/or customers, as and when requested. The system 100 includes an integration agent 110 that may be a software module for coordinating communication between different API related systems, for example, between API management system 120 and one or more enterprise systems. Enterprise systems may include different software modules for performing different types of enterprise operations. Enterprise systems may include customer relationship management (CRM) system 130, enterprise resource planning (ERP) 140 and API consumption plan store 150. The API management system 120 stores APIs and API products in an API repository, where the APIs and the API products may be accessible to users through user interfaces.

A user may send either an access request or a create request to API management system 120. The access request facilitates the user to access the stored APIs and API products in an API repository. On the other hand, the create request facilitates the user to create new APIs and/or API product and store the newly created APIs/API products into the API repository. The API management system 120 forwards the received request, may include either an access request or a create request, to an integration agent 110. The integration agent may then forward the request to the other enterprise systems (130, 140 and 150) for providing required services by retrieving the required information from the enterprise systems (130, 140 and 150). For example, when a create request is received for creating an API at the API management system 120, then the integration agent 110 may forward the request to the CRM system 130 to determine and retrieve user related information such as user name, user type, agreements associated with the user etc. Similarly, when an access request is received corresponding to API products at the API management system 120, then the integration agent 110 may coordinate with the API consumption plan store 150 to determine and retrieve the API consumption plan related information associated with the access request.

In one embodiment, the API consumption plan related information may include type of consumption plan, consumption parameters, policies associated with the determined consumption plan, etc. A list of consumable items may be retrieved from the API consumption plan store 150, based on the consumption parameters. Further, an API consumption data is then computed based on the retrieved consumable items. The computed API consumption data may include, for example, consumption information related to chargeable consumable items and/or non-chargeable consumable items. A chargeable consumable item is an item which consumption by a consumer is charged based on usage. For example, watching a video by making an API-video-access request, the consumable items in such a scenario may include but is not limited to time, internet-data consumed for watching the video etc. A non-chargeable consumable item is an item which consumption is free of charge for the consumer, irrespective of the usage.

The integration agent 110 may coordinate with the ERP system 140 to generate a consumption document based on the API consumption data and the consumable items retrieved. For example, the integration agent 110 may coordinate with the API management system 120 for receiving information related to API access request corresponding to the subscribed API product such as video-API-product. Based on the received information, the integration agent 110 may coordinate with the CRM system 130 for retrieving subscriber related information. The integration agent 110 may further coordinate with the API consumption plan store 150 for receiving the consumption plan associated with the subscribed API products such as pre-paid plan and related consumable/non-consumable items. For example, a consumption plan may define that downloading a video of size smaller than 10 MB is free and downloading a video of size greater than 10 MB is charged a particular amount. The integration agent 110 may forward information for consumption over a given period of time received from API management system 120, CRM system 130 and API consumption plan store 150 to the ERP system 140 for generating a consumption document. The consumption document entails consolidated charge details computed by the ERP system 140, based on the consumption of the APIs corresponding to the subscribed API products. The generated consumption document is forwarded to the respective subscriber retrieved from the CRM system 130. The integration agent 110 may allow two-way communication between the enterprise systems (130, 140 and 150) and the API management system 120, for retrieving and computing information, for example, API consumption data.

Figure 2:
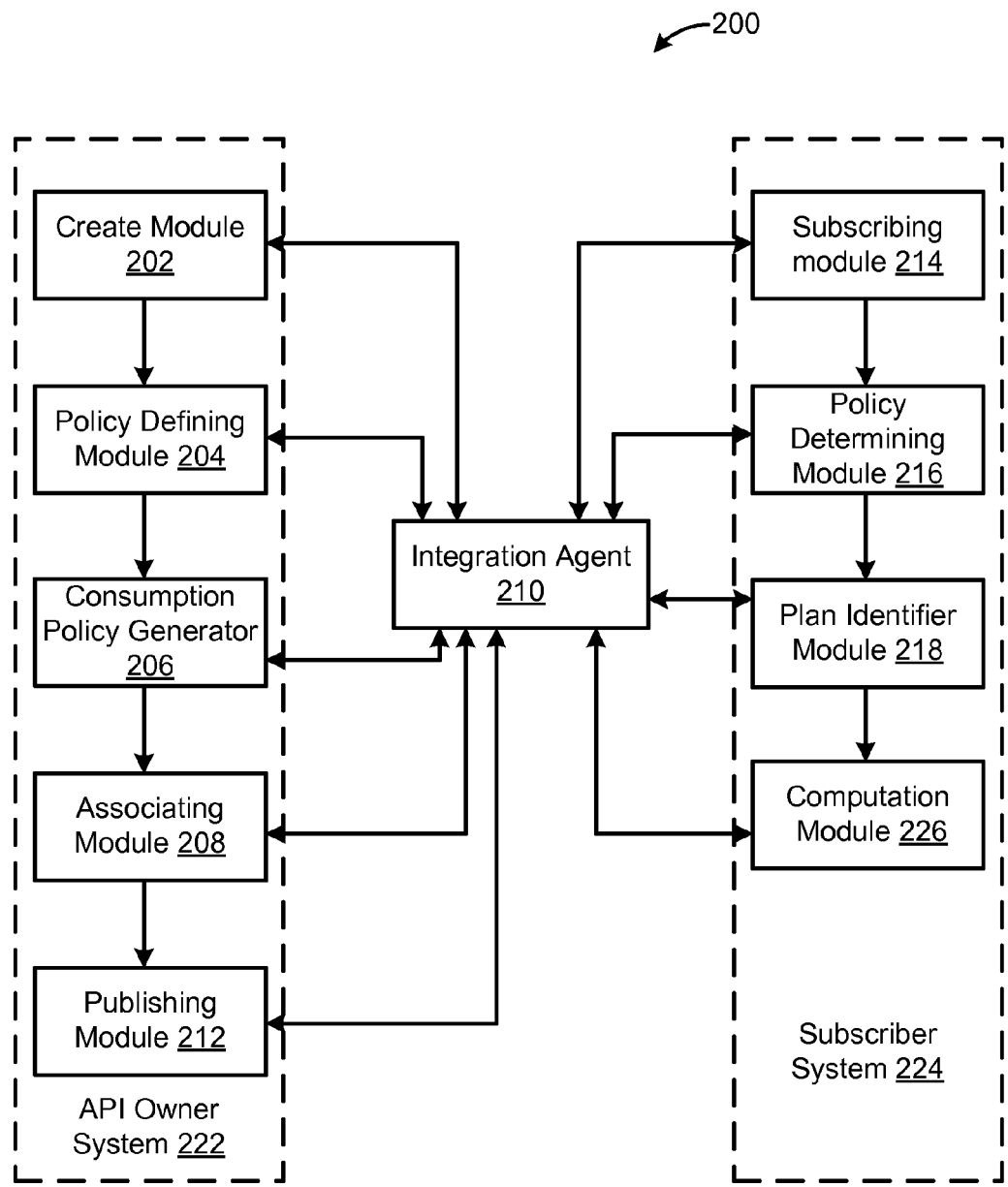
FIG. 2 is a block diagram illustrating a system for computing consumption of APIs, according to an embodiment.

FIG. 2 is a detailed block diagram of system 200 for computing consumption of APIs according to an embodiment. Users may register themselves with the API management system as API owners and/or subscribers by accessing respective systems (222 and 224). The API management system is associated with the system (222 and 224). In an embodiment, the API owner may be an individual or an organization. The integration agent 210 coordinates with the API management system to receive and store user registration information into CRM system. The API owners and the subscribers may be registered with the CRM system by providing requisite credentials in a pre-determined format. For example, a registration form may entail a list of requested user credentials such as name, age, address, working technology, organization, financial details and the like.

In one embodiment, for computing consumption of APIs, a user registers at the CRM system as an API owner or subscriber with the API management system. The API owners and subscribers are registered with the system 200 by providing requisite credentials in a pre-defined format. Typically, the pre-defined format is a registration form where an unregistered user can provide requested information. The information related to registration of the API owners and subscribers are received at the integration agent 210 from the API management system and stored into the CRM system. The registered API owners and subscribers are provided with secure login details such as username and password.

As shown in FIG. 2, the system 200 includes API owner system 222 that is accessed by API owners and subscriber system 224 that is accessed by API subscribers. In an embodiment, the API owner system 222 and the subscriber system 224 are associated with the API management system for processing user requests, e.g., an API owner may request for creating API products. Based on the user request received at the API owner system 222 and the subscriber system 224, the API management system communicates and coordinates the received user requests to the integration agent 210. When an API owner logins into the API management system, the system 200 redirects the user to the API owner system 222. When a subscriber logins into the API management system, the system 200 redirects the user to the subscriber system 224. In an embodiment, the API owner system 222 and the subscriber system 224 are provided with one or more user specific functionality modules. For example, the API owner system 222 may include functionality modules to facilitate the API owner to create and/or manage APIs and/or API products, while the subscriber system 224 may include functionality modules to facilitate purchase of API product subscription and also track consumption of the subscribed API products. In an embodiment, the functionality modules of the API owner system 222 and the subscriber system 224 are enabled to coordinate with integration agent 210.

In an embodiment, the functionality modules of the API owner system 222 may include create module 202, policy defining module 204, consumption policy generator 206, associating module 208 and publishing module 212. The API owner, after registration, may create and publish one or more API products in the API management system.

According to an embodiment, the API management system may store APIs into API repository. The API owner may also create several APIs and store them into the API repository. The created and stored APIs may include common APIs, which may be used in different programs, or program specific APIs that may be specific to a particular computer program. Based on the APIs created and/or available at the API management system, the create module 202 enables the API owner to create API products. An API product may be considered as a package of one or more APIs selected from the created and stored APIs in the API repository and/or standard APIs available on the API management system. For example, the API owner may wish to create a video related API product or video-API-product for short. The API owner may define the API product by providing information such as API product type, technology domain, functioning of the APIs associated with API product and the like. For example, defining the video-API-product information may include API product type as videos and audios; technology domain as mobiles, creation of online videos and the like. Upon creating the API product, a "create" request is generated by the create module 202 that may be communicated to the integration agent 210. The integration agent 210 may prompt the API owner, e.g., by way of notification at the API management system, to define policies corresponding to the API product. At the policy defining module 204, the API owner may initially define policies and store the defined policies in API repository accessible by the API management system. The pre-defined policies relate to the APIs defined by the API owner. Next, the API owner may select appropriate pre-defined policies stored in the API repository. For example, the API owner may select pre-defined policies related to videos and audios applicable to the video-API-product. Pre-defined policies related to videos and audios may include:

- maximum video size limit is 25 MB,
- creating a video smaller than 10 MB to be charged 8 currency units,
- creating a video bigger than 10 MB and smaller than 20 MB to be charged 12 currency units,
- creating a video bigger than 20 MB to be charged 16 currency units, and
- creating a video smaller than or equal to 2 MB to be charge free.

In one embodiment, upon receiving confirmation on the selected pre-defined policies from the API owner, the policy defining module 204 generates a policy defining request. The policy defining request is received by the integration agent 210 from the API management system. The policy defining request is received for associating the aforementioned selected pre-defined policies with the "create" request generated by the create module 202. The integration agent 210 may coordinate with an API consumption plan store to retrieve API consumption plans stored in the plan repository.

The API consumption plan store receives requests for retrieving one or more API consumption plans stored in the plan repository. The API consumption plans can be of different types, for example, pre-paid plan, post-paid plan, flat-rate plan, hybrid plan and refill plan. A pre-paid consumption plan may include conditions for counting number of API access requests received corresponding to the API product in real time. A post-paid consumption plan may include conditions for counting number of API access requests received corresponding to the API product while the subscriber is offline. Additionally, in the post-paid consumption plan a list of consumable items and non-consumable items related to the API access requests for the API product is written. For example, when an API access request received related to a video API and/or an audio API, is either categorized as a consumable item or a non-consumable item. These consumable and non-consumable items are written based on the pre-defined policies adhered with the video-API-product. The refill plan may enable the subscribers to refill a balance in a subscriber account as and when required, so that the consumption of the APIs may continue without any interruptions.

Upon receiving the number of API consumption plans retrieved from the API consumption plan store, the integration agent 210 may send a prompt request to the API management system to prompt the API owner at the API owner system 222 to provide selection of one or more API consumption plans. The API owner may select one or more API consumption plans and link it with the selected pre-defined policies. The integration agent 210 receives the API consumption plan selection from the API management system and instructs the consumption policy generator 206 to generate a number of consumption policies. The consumption policies are generated by mapping the pre-defined policies to the API consumption plans associated with the API product. The generated consumption policies are run-time consumption procedures to measure the consumption of the API product in real time. In one embodiment, the consumption policies may include a policy to retrieve a context of API access request, a policy to retrieve request parameters of the API access request, a policy to determine a response of the API access request, a policy to compute the volume of data associated with the API access request, a policy to trigger integration agent 210 to fetch subscriber details from the CRM system, a policy to trigger integration agent 210 to fetch API product details from the API management system, a policy to trigger integration agent 210 to map API consumption parameters to the API consumption plan etc. The consumption of the API product is measured by monitoring the API access requests received corresponding to the API product created by the API owner.

In one embodiment, the integration agent 210 sends a request to the API management system, for prompting the API owner at the API owner system 222 to associate the consumption policies with the "create" request generated by the create module 202. The "create" request relates to the API product that the API owner wish to create. The consumption policies are generated by the consumption policy generator 206. The API owner accesses the associating module 208 of API owner system 222 to associate the consumption policies with the "create" request. Upon receiving a confirmation to associate the selected API consumption policies with the "create" request of the API product, the publishing module 212 of the API owner system 222 of the API owner system 222 is triggered. The publishing module 212 publishes and stores the API product created by the API owner into the API repository accessible by the API management system. Additionally, the integration agent 210 receives the published API product from the API management system and coordinates with the CRM system and the ERP system to store an instance of the published API product into a CRM repository and a database accessible by the ERP.

The functionality modules of the subscriber system 224 of the subscriber system 224 of the API management system may include subscribing module 214. The subscriber system 224 may also include modules which may internally communicate with the integration agent 210, such as policy determining module 216, plan identifier 218 and computation module 226. In an embodiment, the policy determining module 216, the plan identifier 218 and the computation module 226 may not require user inputs. The aforementioned modules (216, 218 and 226) facilitate execution of a work process for computing an API consumption data based on the API access request received at the API management system.

In an embodiment, the subscriber may be an individual or an organization. The subscriber may wish to develop a computer program that requires several APIs. Creating a new API for the computer program may be a time consuming task and may require highly skilled labor. The system 200 facilitates the subscriber with the API products available at the API management system. The subscriber may access the subscribing module 214 for accessing the API products and for enabling the subscriber to select the API product having appropriate APIs for developing the computer program. For example, the subscriber may wish to develop a mobile based video software or program for creating online videos. The subscriber may subscribe to the video-API-product published on the API management system.

The system 200 may facilitate the subscriber with the desired API products published on the API management system. The subscriber may obtain subscription for a plurality of API products for the purpose of developing the computer program. The subscriber while registering with API management provides information related to region and currency. The subscriber's registration information may be received by the integration agent 210. The integration agent 210 may then send a request to store instances of the subscriber's credentials into the CRM system. Also, the integration agent 210 may send requests to the ERP system and API consumption plan store to store instances of the subscriber's registration information, e.g., pertaining to region and currency. The information exchanged between the enterprise systems such as CRM system 230, the ERP system 240 and the API consumption plan store 250 are coordinated by the integration agent 210.

The subscriber may login into the system 200 through the subscriber system 224 provided at the API management system. Once logged into the API management system, the subscriber can view and access details of the published API products. Based on the subscriber information provided at the time of registration the system 200, may generate a list of recommended API products for the subscriber. The subscriber may select one or more API products or may select from the recommended list of API products. Upon receiving confirmation of the selection of the API products from the subscriber, the subscribing module 214 generates and communicates a subscription request to the integration agent 210. The integration agent 210 may send request to retrieve and determine the API owner(s) associated with the subscribed API products, from the CRM system. This is done by communicating an identification request to the CRM system.

Upon receiving the aforementioned request, the CRM system retrieves information pertaining to the API owner(s) associated with the subscribed API products. The CRM system sends the retrieved information, for example, API owner(s) information and the corresponding API subscription agreement from the CRM repository, to the integration agent 210. The integration agent 210 may send the retrieved subscription agreement associated with the subscribed API products to the API management system. The subscription module 214 prompts the subscriber to provide acceptance of the terms and conditions mentioned in the subscription agreement. The subscription agreement may entail legally binding document defining terms and conditions with which the subscriber shall comply.

Upon receiving the subscriber's acceptance of the subscription agreement, the integration agent 210 sends a request to the CRM system to store the accepted subscription agreement, corresponding to the records of the subscriber stored in the CRM repository. The instances of the subscription agreement stored in the CRM repository may be referred to as corporate agreement. In parallel, the integration agent 210 may also send requests to the ERP system and to the API consumption plan store to store instances of the accepted subscription agreement.

In an embodiment, based on the request to store subscription agreement accepted by the subscriber, the API consumption plan store may create an access object which will bind the API consumption plan with the subscriber and the API owner. The instances of the subscription agreement stored in the API consumption plan store may be referred as contract agreement. The acceptance of the subscription agreement by the subscriber indicates confirmation of the subscription request related to selected API products. The subscriber may receive a subscription key or a passcode generated by the API management system corresponding to the subscribed to API products. The subscription key entails information related to the subscriber, subscribed API products, etc. The subscription key may provide secure access to the subscribed to API products by authenticating an API access request, when received at the API management system. In an embodiment, when the API access request is received corresponding to the subscribed API products, the integration agent 210 sends key determination request to the API management system to determine the subscription key associated with the API access request. The subscription key enables the integration agent 210 to uniquely identify API access requests.

The integration agent 210 may send trigger requests to the API management system, to trigger the policy determining module 216. The policy determining module 216 may determine consumption policies associated with the subscribed to API products. In an exemplary embodiment, the consumption policies may include a policy to trigger the integration agent 210 to fetch subscriber's details from the CRM system, a policy to trigger integration agent 210 to fetch API product details from the API management system, a policy to trigger integration agent 210 to map API consumption parameters to API consumption plans, a policy to retrieve context of received API access requests, a policy to retrieve request parameters of API access requests, a policy to determine responses to API access requests, a policy to compute the volume of data associated with API access requests and the like. Upon successful determination of the consumption policies associated with subscribed to API product, the integration agent 210 sends trigger request to trigger the plan identifier 218 to identify the API consumption plan associated with the determined consumption policies related to the subscribed API product. The API management system sends information related to the identified API consumption plan associated with the determined consumption policy to the integration agent 210. Next, the integration agent 210 may send check request to the API consumption plan store, to check whether the identified API consumption plan is available in the existing pool of API consumption plans stored therein. Upon receiving confirmation from the API consumption plan store that the identified API consumption plan is available, the integration agent 210 may send a trigger request to the computation module 226. The computation module 226 monitors the incoming API access requests for accessing the subscribed to API products.

In an embodiment, when an API access request is received, the API management system sends an instance of the API access request information to the integration agent 210. For example, an access request may be received for the video API product to create an online video through the computer program developed by the subscriber. The integration agent 210 sends trigger request to the API management system to trigger the policy determining module 216 to extract the subscription-key and the information related to the subscribed to video API product from the API access request. The integration agent 210 may send a "retrieve" request to the CRM system to retrieve the subscriber's details and a subscription agreement corresponding to the determined subscription key. The subscriber's details may include information such as name, technology domain, region, currency and the like. The subscription agreement is the legally binding document entailing terms and conditions that the subscriber shall comply, when subscribing for the video API product. The policy determining module 216 may determine the consumption policy associated with the subscribed to video-API product. Upon successful determination of the consumption policy, the integration agent 210 coordinates and triggers the plan identifier 218 of the API management system, to identify the API consumption plan associated with the subscribed to API product. The API management system sends information related to the API consumption plan retrieved that is associated with the subscribed to API product to the integration agent 210. The integration agent 210 may send verification request to the API consumption plan store 250, to verify the API consumption plan.

In one embodiment, the integration agent 210 sends trigger request to the API management system, to trigger the computation module 226. The computation module 226 receives the determined consumption policy and the identified API consumption plan from the policy determining module 216 and the plan identifier 218. The computation module 226 may compute consumption data based on the received API access requests and on the identified consumption plans. The computation module 226 retrieves an API consumption information from the computation data based on a plurality of API consumption parameters defined in an identified API consumption plan. The integration agent 210 communicates with the API consumption plan store 250 to retrieve consumable items and non-consumable items associated with the identified API consumption plan. For example, when multiple access requests are received corresponding to the video API product, the computation module 226 categorizes the access requests as consumable items or non-consumable items based on the API consumption parameters. The API consumption parameters may include number of API calls, charges applied based on the consumption policies determined, request size, request filters such as categories, request type (such as create, update, delete, query, read etc.), response size and response type such as error, success etc. In one embodiment, a consumable item corresponds to a paid item and a non-consumable item corresponds to a non-paid item. Charges for the consumable items are computed based on the identified API consumption plan.

In an embodiment, the computation module 226 monitors the API access request against the subscribed to API product and computes the related consumable items and non-consumable items. At the end of a pre-defined time period, the integration agent 210 sends a retrieve request to the ERP, to fetch the aggregated consumable items, e.g., the aggregated charge of the paid items corresponding to the subscribed API product. Based on the determined pre-defined policies associated with the subscribed to API product, the charges of the similar consumable items may be aggregated under a common heading, and charges of non-similar consumable items not aggregated together. For example, when multiple access requests are received corresponding to the video-API-product, the consumable and non-consumable items determined may include information as illustrated in Table 1:

TABLE 1

| Request S. no. | Size of the created video | Charges applicable as per consumption policy (in currency units) |
|---|---|---|
| 1 | 8 MB | 8 |
| 2 | 14 MB | 12 |
| 3 | 2 MB | free |
| 4 | 1 MB | free |
| 5 | 21 MB | 16 |
| 6 | 18 MB | 12 |
| 7 | 5 MB | 8 |
| 8 | 10 MB | 8 |
| 9 | 1 MB | free |
| 10 | 24 MB | 16 |
| :: | :: | :: |

The consumable items are communicated to the ERP. The integration agent 210 assists in coordinating the determined consumable and non-consumable items computed at the API management system with the ERP. The integration agent 210 sends retrieve request to the ERP system to retrieve the aggregated and non-aggregated items based on the consumable items and non-consumable items computed at the API management system. For example, the aggregated and non-aggregated items may include information as illustrated in Table-2. In an embodiment, the aggregated items and the non-aggregated items correspond to the API consumption data.

TABLE 2

| No. of consumable items and non-consumable items | Pre-defined policy | Charges applicable per item (in currency units, e.g. cents) | Aggregated items and non-aggregated items (in currency units, e.g. cents) |
|---|---|---|---|
| 3 | Video size=2 MB | 0 | 0 |
| 3 | Video size=10 MB | 8 | 24 |
| 1 | 10 MB=Video size=20 MB | 12 | 12 |
| 2 | 20 MB=Video size | 16 | 32 |
| :: | :: | :: | :: |
| Total | | | 68 |

In one embodiment, the API consumption plans stored in the API consumption plan store 250 may relate to a pre-paid plan, a post-paid plan, a flat-rate plan, a hybrid plan, a refill plan etc. Accordingly, when the API consumption plan is identified by the plan identifier 218 as a pre-paid plan then the integration agent 210 sends retrieve request to the CRM system to retrieve subscriber details that may include information about the subscriber's account balance. The integration agent 210 may also send, e.g., in parallel to the retrieve request to the CRM system, a trigger request to the API management system to trigger the computation module 226 to identify a minimum required balance from the identified API consumption plan. The subscriber should have at least the aforementioned minimum balance in the subscriber's account to request API access. The integration agent 210 communicates retrieved subscriber's account details to the computation module 226 by coordinating with the API management system. In accordance with the example, the minimum balance required is 8 currency units or cents to grant an access request corresponding to the video API product. In another embodiment, the instances of the subscriber details stored in the API consumption plan store may include information related to subscriber's account details. Upon receiving acceptance of the subscription agreement, the API consumption plan store may use its own internal persistence to check available balance in the subscriber's account and the minimum required balance to accept the API access request. The integration agent 210 may periodically retrieve balance information related to the subscriber's account from the API consumption plan store 250, and send subscriber's balance update request to the API management system and the CRM system 230 accordingly.

In one embodiment, when the API consumption plan is identified by the plan identifier 218 as a refill plan, the integration agent 210 sends trigger requests to the API management system, the computation module 226 checks and enables the subscriber to refill the balance in the subscriber's account as and when required, so that the consumption of the APIs may be continued without interruptions. The integration agent 210, in parallel to the trigger requests to the API management system 210, may send update requests to the API consumption plan store and the CRM system to update the subscriber's balance related information.

The computation module 226 determines whether the minimum required balance is available to the subscriber, by examining the subscriber's details retrieved from the CRM system. If the minimum required balance is available in the subscriber's account, the API access request is granted access to the corresponding subscribed to API product at the API management system. On the other hand, if the minimum required balance is not available in the subscriber's account, the API access request is rejected, thereby restricting access to the corresponding subscribed to API product at the API management system.

In one embodiment, when the API consumption plan is identified by the plan identifier 218 as a post-paid plan, the integration agent 210 sends trigger requests to the API management system to trigger the computation module 226 to retrieve the API consumption information with respect to the API consumption parameters and generate aggregated consumable items. The integration agent 210 may also send retrieve requests to the CRM system to retrieve the subscriber's account details stored therein. The integration agent 210 sends the retrieved subscriber's account details, to the API management system. In another embodiment, the instances of the subscriber's details pertaining to the subscriber's account details may be stored in the API consumption plan store. The subscriber's account details include information related to subscriber's account. Upon receiving acceptance of the subscription agreement, the API consumption plan store may use its own internal persistence to check the subscription limit associated with the subscriber's account. The integration agent 210 may periodically retrieve balance information related to the subscriber's account from the API consumption plan store, and sends subscriber's balance update request to the API management system and the CRM system, accordingly.

The information related to the subscriber's account details is received by the computation module 226. The computation module 226 compares the aggregated consumable items with the received subscription limit associated with the subscriber's account. This comparison may be performed by the computation module 226 when an API access is requested corresponding to the subscribed to API product. When the total aggregated charge of the consumable items is below the determined subscription limit, the API access request is processed at the API management system. On the other hand, when the total charge for the aggregated consumable items is greater than the subscription limit, the API access request is rejected. This restricts access to the corresponding subscribed to API product at the API management system. For example, the subscription-limit associated with the subscriber may be 600 MB out of which the subscriber has already consumed 94 MB by making ten access requests corresponding to the video API product (8 MB+14 MB+2 MB+1 MB+21 MB+18 MB+5 MB+10 MB+1 MB+24 MB). In one embodiment, when the API consumption plan identified by the plan identifier 218 is a refill plan, the integration agent 210 sends trigger request to the API management system. The computation module 226 checks and enables the subscriber to refill the balance in the subscriber account as and when required, so that the consumption of the APIs may be continued without any interruption. In parallel, the integration agent 210 send update requests to the API consumption plan store and the CRM system to update the subscriber balance related information.

In an embodiment, the computer program developed by the subscriber may attract users, referenced to as customers of the subscriber. The customers may install and utilize the computer program developed by the subscriber, e.g., execution of a particular work process. Upon utilizing the computer program, the customers may transmit API access requests to the API management system for the API product subscribed to by the subscriber for developing the computer program initially. The policy determining module 216 of the API management system determines subscription key associated with an API access request. The API management system sends an instance of the received API access request to the integration agent 210. In response, the integration agent 210 sends retrieve request to the CRM system, to retrieve the subscriber's details and subscription agreement corresponding to the determined subscription key. Upon receiving the subscriber's details form the CRM system, the integration agent 210 sends trigger request to the API management system, to trigger the computation module 226 to compute the API consumption data corresponding to the API products the subscriber subscribed to.

In an embodiment, the CRM system, ERP system and API consumption plan store may be deployed on premise. The integration agent 210 may coordinate with the CRM system to retrieve information related to the user from whom the API management system received the API related request. In one embodiment, the integration agent 210 may coordinate with the API consumption plan store to request determining and retrieving an appropriate API consumption plan associated with the API related request received from the API management system initially. Thereby, the integration agent 210 ensures delivery and distribution of API related data across the enterprise systems such as CRM system, ERP system, API consumption plan store and the API management system for executing the work process.

The CRM system assists an organization to store and manage user related information into a CRM repository. The integration agent 210 coordinates with the CRM system, ERP system and API consumption plan store, either to store or to retrieve information corresponding to particular API product based on the API access request received at the API management system. The CRM system stores instances of the API products created by the API owner on the API management system. According to one embodiment, the ERP system helps the organization to compute the API consumption data when the integration agent 210 coordinates the API consumption information from the API management system and the API consumption plan from the API consumption plan store. According to one embodiment, the API consumption plan store stores the plans related to API consumption into a plan-repository.

Figure 3:
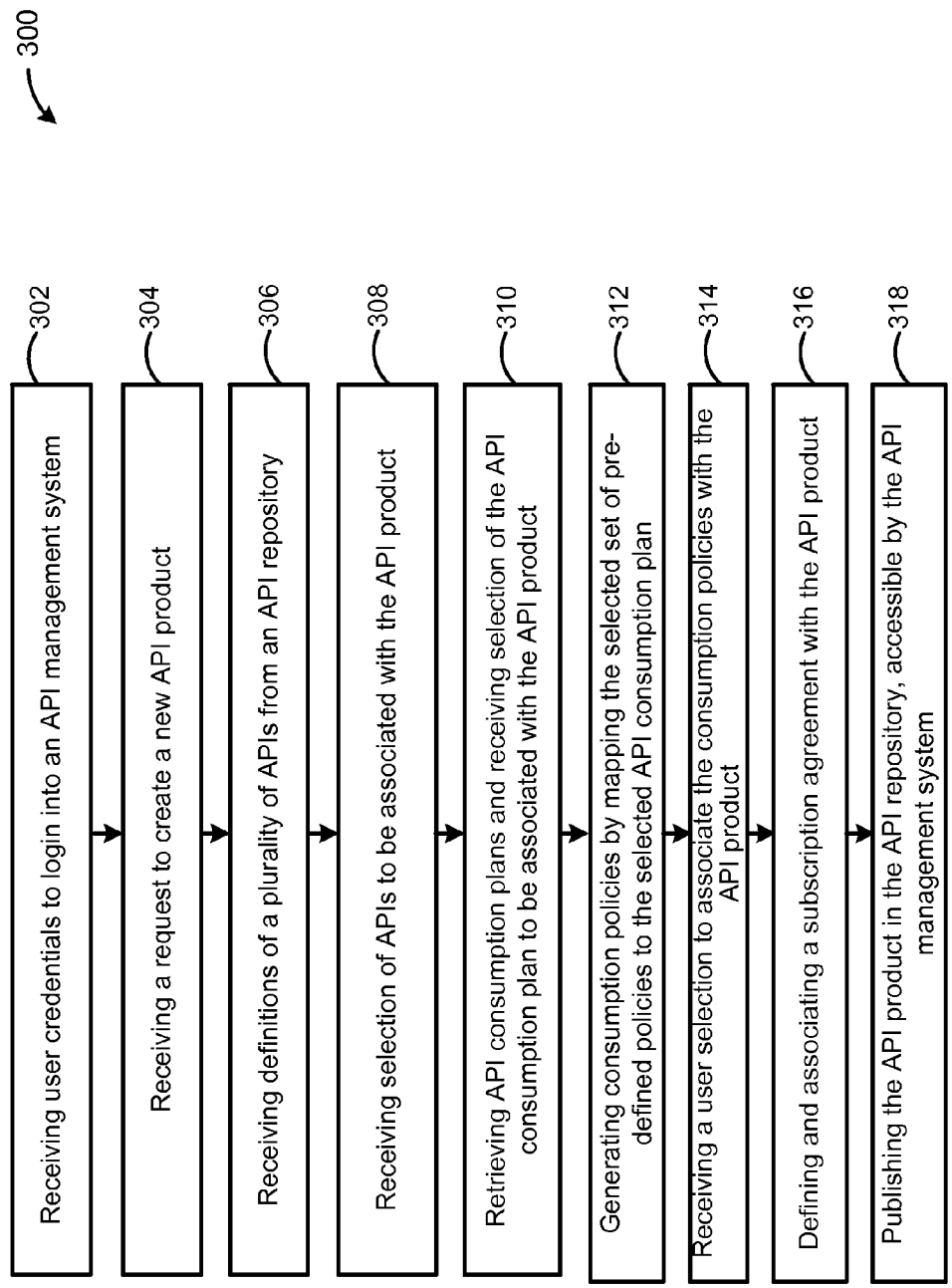
FIG. 3 is a flow diagram illustrating a method for creating an API product, according to an embodiment.

FIG. 3 is a flow diagram illustrating process 300 for creating an API product, according to an embodiment. Initially, at 302, user credentials is received to login to an API management system. Upon successful login, the API owner is redirected to an API owner system that is associated with the API management system. The API owner system entails user specific functionality modules. These functionality modules may enable the API owner to execute a work process such as defining APIs, creating API products, publishing the API products, managing the API products, and the like. At 304, a request may be received to create a new API product. An API owner may wish to create API products. To accomplish this, the API owner may access create module of the API owner system. The create module is a functionality module, for creating new API products. For example, the API owner, 'COMPANY-A', may send a request for creating the API product, 'PRINT-API', by accessing the create module of the API owner system. The create request is then sent to an integration agent from the API management system. Upon receiving the create request, a retrieve request is transmitted from the integration agent to a CRM system. The retrieve request includes instructions to retrieve information details of 'COMPANY-A'. The integration agent also sends association request to the API management system, to prompt the user to associate APIs with the created product. For example, the integration agent sends association request to the API management system to prompt the "COMPANY A" to associate APIs with a created product "PRINT-API".

At 306, definitions of a plurality of APIs, defined and stored by the API owner, are received from an API-repository accessible by the API management system. In addition, the API owner selects one or more APIs to constitute the API product. This is accomplished by prompting, the API owner to associate one or more APIs that would constitute to the API product. The APIs constituting the API product may be defined by the API owner. The API owner may also select from APIs already created earlier or from a standard API list stored in the API-repository, or may define new APIs for the API product. For example, 'COMPANY-A' may select one or more printing related APIs such as 'Print-API-1', 'Print-API-2', and 'Print-API-3', to constitute the 'PRINT-API'.

At 308, receiving a selection of APIs to be associated with the API product. The integration agent sends prompt reminder API owner system. This is to prompt the API owner to define API policies corresponding to the created API product. The API owner may define new policies and append them to a list of pre-defined policies stored in API-repository. Alternatively or additionally, the API owner may select from pre-defined policies already stored in the API management system. The API owner may associate the selected and/or newly added policies with the API product. For example, the pre-defined policies may include printing related policies such as 'first 10 printing requests are free of charge', 'apply charges from the 11$^{th}$ printing request', 'even number printing requests to be charged 20 currency units per page', 'odd number printing requests to be charged 18 currency units per page', 'bulk printing request to be charged 12 currency units per page for the first 100 pages and the remaining pages 15 currency units per page', 'bulk printing request to be charged 15 currency units if more than 50 pages and fewer than 100 pages', 'maximum printing limit is 4,000 pages per week per subscriber', 'maximum printing limit is 18,000 pages per month per subscriber', 'color printing requests to be charged 40 currency units per page', 'bulk color printing requests to be charged 30 currency units per page' and the like. 'COMPANY-A' may select and associate a set of policies from the above mentioned pre-defined and/or newly added polices, which may include the following:

first 10 printing requests are free,
apply charges from the 11$^{th}$ printing request,
bulk printing request to be charged 12 currency units per page for the first 100 pages and the remaining pages 15 cents per page,
maximum printing limit is 4000 pages per week per subscriber,
bulk printing request to be charged 15 currency units if more than 50 pages and fewer than 100 pages, and
color printing requests to be charged 40 currency units per page.

At 310, a retrieve request is sent, e.g., by the integration agent, to retrieve API consumption plans stored in the API consumption plan store. Receiving, API owner's, selection of an API consumption plan from the retrieved API consumption plans, to be associated with the API product. Upon submitting confirmation of the selected pre-defined policies to be associated with the API product, the API consumption plans retrieved from the API consumption plan store, rendered on the API owner system 222 of the API management system. The API owner may select the API consumption plans to be associated with the API product. These API consumption plans may be a prepaid plan, a post-paid plan, a flat-rate plan, a hybrid consumption plan, a refill plan, etc. For example, the API owner may select the 'POST-PAID' plan as the API consumption plan.

At 312, upon receiving selection of the API consumption plan to be associated with the API product, consumption policies are generated by mapping the selected set of policies to API consumption plan associated with API product at the API management system. For example, the consumption policies may get associated with the 'PRINT-API' either automatically or manually. In an embodiment, the consumption policies may include 'policy to extract response of the print requests received', 'policy to extract print request parameters from print access request received', 'policy to map the extracted print request parameters to the API consumption plan parameters associated with the identified API consumption plan', 'policy to trigger the integration agent to send retrieve request to the API consumption plan store along with the requested set of consumption parameters' and the like. These consumption policies may be stored at the API management system.

At 314, a user selection is received to associate the generated consumption policies with the API product. The API management system sends a request to prompt the API owner to associate the generated consumption policies with the API product. For example, 'COMPANY-A' may associate print related consumption policies generated with the 'PRINT-API-PRODUCT'.

At 316, a subscription agreement, entailing terms and conditions, is created and related to the API product. The API owner may use an existing template of the subscription agreement stored in the API management system for the purpose of preparing an API product specific subscription agreement. The subscription agreement is a legally binding document for subscribers subscribing to the API product.

At 318, the API products in the API repository are published. This can be accomplished by transmitting a publish request from the integration agent to the API management system, for the purpose of prompting the API owner to publish the API product. Upon receiving publishing information related to the API product, the integration agent sends record request to the CRM system. This is done for recording instances of the published API product and associated subscription agreement into the CRM system. Also, record requests are sent from the integration agent to the ERP system, recording information related to the published API product.

Figure 4:
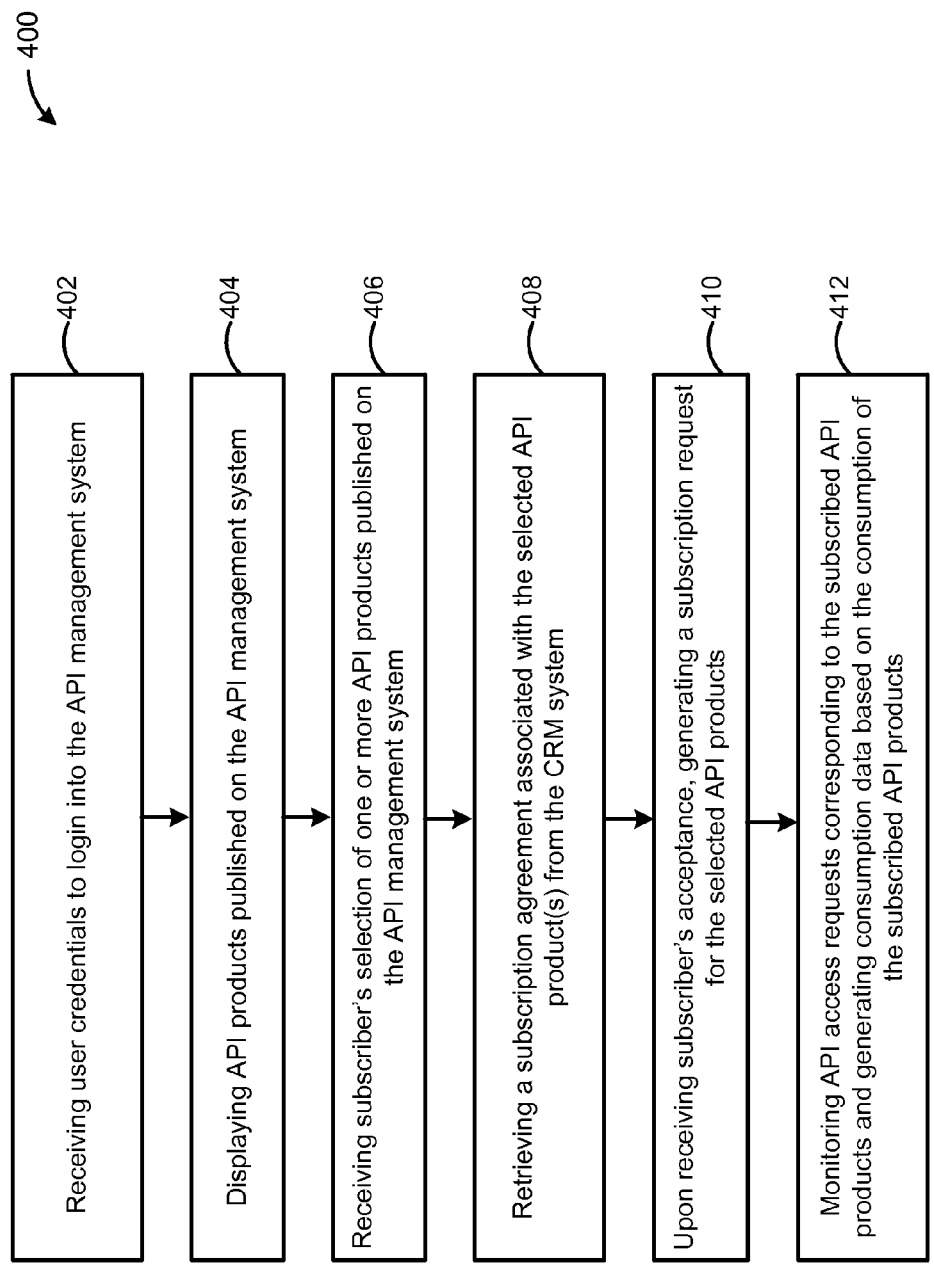
FIG. 4 is a flow diagram illustrating a method for subscribing and processing APIs consumption, according to an embodiment.

FIG. 4 is a flow diagram illustrating process 400 for subscribing to and processing APIs, according to an embodiment. Initially, at block 402, user credentials are received, at an API management system, to login into the subscriber system. Upon successful login, the subscriber is redirected to a subscriber system that includes user specific functionality modules at the API management system. In an embodiment, the subscriber system is associated with the API management system.

In an embodiment, the subscriber may wish to develop a computer program which may require program specific APIs for its execution. The subscriber may require appropriate API or a package of APIs (such as API products) for developing the computer program. At 404, the subscriber may able to view and select API products published on the API management system, which would suffice the subscriber's requirement for developing the computer program. For example, the subscriber 'COMPANY-B' may wish to develop a computer program related to printing. 'COMPANY-B' may login into API management system to access the printing related API products. The 'COMPANY-B' and select 'PRINT-API-PRODUCT' for subscription.

At 406, subscriber's selection of the API products is received at the subscriber system of the API management system. Based on the API products selected by the subscriber, a subscription request is generated at the API management system. The subscription request may be communicated to the integration agent. In turn, a retrieving request may be sent from the integration agent to the CRM system, to retrieve subscriber related information and the subscription agreement associated with the selected API product/s, stored into the CRM repository.

At 408, a subscription agreement associated with the selected API products is retrieved from the CRM system. The retrieved subscription agreement is then rendered on the subscriber system of the API management system. Next, a subscriber acceptance for the subscription agreement is received at the API management system. The subscription agreement defines a legally binding document entailing terms and conditions for the subscriber. The subscriber may provide acceptance to the subscription agreement rendered on the subscriber system. In one embodiment, the subscriber's acceptance of the subscription agreement is received. At 410, upon receiving subscriber's acceptance to the subscription agreement, a subscription request is generated for the selected API products. Upon receiving subscriber's acceptance for the subscription agreement, the integration agent sends a mapping request to the CRM system to map the subscription request with the corresponding API owner. For example, 'COMPANY-A' owns the 'PRINT-API', upon receiving acceptance of the subscription agreement the mapping request is sent to the CRM system. This is done to map the accepted subscription agreement with the 'COMPANY-A'. The integration agent may also send, in parallel to the mapping request to the CRM system, a recording request to the ERP system and the API consumption plan store to record instances of the accepted subscription agreement.

At 412, monitoring API access requests corresponding to the subscribed API products and generating consumption data is based on the consumption of the subscribed API products. The generated consumption data may be accessible to the respective subscribers. When an API access request is received at the API management system, the integration agent sends a triggering request to the API management system, to trigger a policy determining module. The policy determining module is one of the functionality modules of the subscriber system. The policy determining module extracts and determines the subscription-key attached with the API access request and also the consumption policies associated with the subscribed API product. Upon receiving the subscription key, the retrieved request is transmitted to the CRM system from the integration agent, to retrieve the subscriber's details stored into the CRM repository. For example, if the access request received is for printing that corresponds to the 'PRINT-API' product, the integration agent sends a trigger request to the policy determining module to determine the subscription-key, the consumption policies and the subscription agreement associated with the API products. Upon receiving the subscription-key, retrieving information related to the subscriber i.e. 'COMPANY-B' stored in the CRM system. The integration agent may also send trigger request to the policy determining module to of the API management system, to determine the consumption policies associated with the 'PRINT-API' at policy determining module. Based on determined consumption policies, the API consumption plan is identified by plan identifier. The plan identifier is one of the functionality modules of subscriber system. The plan identifier identifies API consumption plan associated with the determined consumption policies. The identified API consumption plan is verified at the API consumption plan store by sending verify request from the integrating agent. Also a list of consumable items are retrieved from the API consumption plan store, The API consumption plan store include a list of non-consumable items, referenced as free items, based on the consumption parameters defined in the identified API consumption plan. For example, the consumable items and the non-consumable items are listed in Table 3. The received print access requests may be categorized into consumable items and the non-consumable items:

TABLE 3

| Request S. no. | Number of printing pages entailed in the print access request | Print type (N: normal, C: color) | Charges applicable as per consumption policy (in currency units) |
|---|---|---|---|
| 1 | 10 | N | free |
| 2 | 2 | N | free |
| 3 | 4 | N | free |
| 4 | 9 | N | free |
| 5 | 5 | N | free |
| 6 | 7 | N | free |
| 7 | 2 | N | free |
| 8 | 3 | N | free |
| 9 | 1 | N | free |
| 10 | 7 | N | free |
| 11 | 200 | N: 194, C: 6 | 2610, 240 |
| 12 | 60 | N | 900 |
| 13 | 5 | C | 200 |
| :: | :: | :: | :: |

The information pertaining to the retrieved consumable items and non-consumable items, from the integration agent are transmitted to the ERP system for determining the aggregated consumable items and non-aggregated items. For example, the aggregated consumable items and non-aggregated items are illustrated in Table 4:

TABLE 4

| No. of consumable items and non-consumable items | Pre-defined policy (based on printing type) number of printing pages | Charges applicable per item (in currency units) | Aggregated items and non-aggregated items (in currency units) |
|---|---|---|---|
| 2 | N: 254 | 12, 15 | 2610 |
| 2 | C: 11 | 40 | 440 |
| :: | :: | :: | :: |
| Total | | | 3050 |

The aggregated consumable items indicate an aggregated charge of the consumable items and the non-aggregated consumable items indicate a non-aggregated charge of the consumable items. Further, the aggregated consumable items and non-aggregated consumable items correspond to an API consumption data computed based on the API consumption information.

In one embodiment, integration agent may be integrated with the API management system and functions as one of the functionality modules of the API management system. In the aforementioned scenario, the integration agent and the API management system share a common data model and store information in a common storage system, e.g., API repository. In another embodiment, the integration agent may be interfaced with any enterprise systems such as ERP system, API management system, CRM system, a convergent charging system, a service management system and API consumption plan store. In the aforementioned scenario, the integration agent and the interfaced enterprise system may, or may not, share a common data model and they may, or may not store data in a common storage system. The integration agent facilitates effective computation of the API consumption data and generating consumption document. The consumption document may be accessed by the subscriber and API owner corresponding to the subscribed to API products. The consumption document may entail information related to the computed API consumption charges over a given time period.

Figure 5:
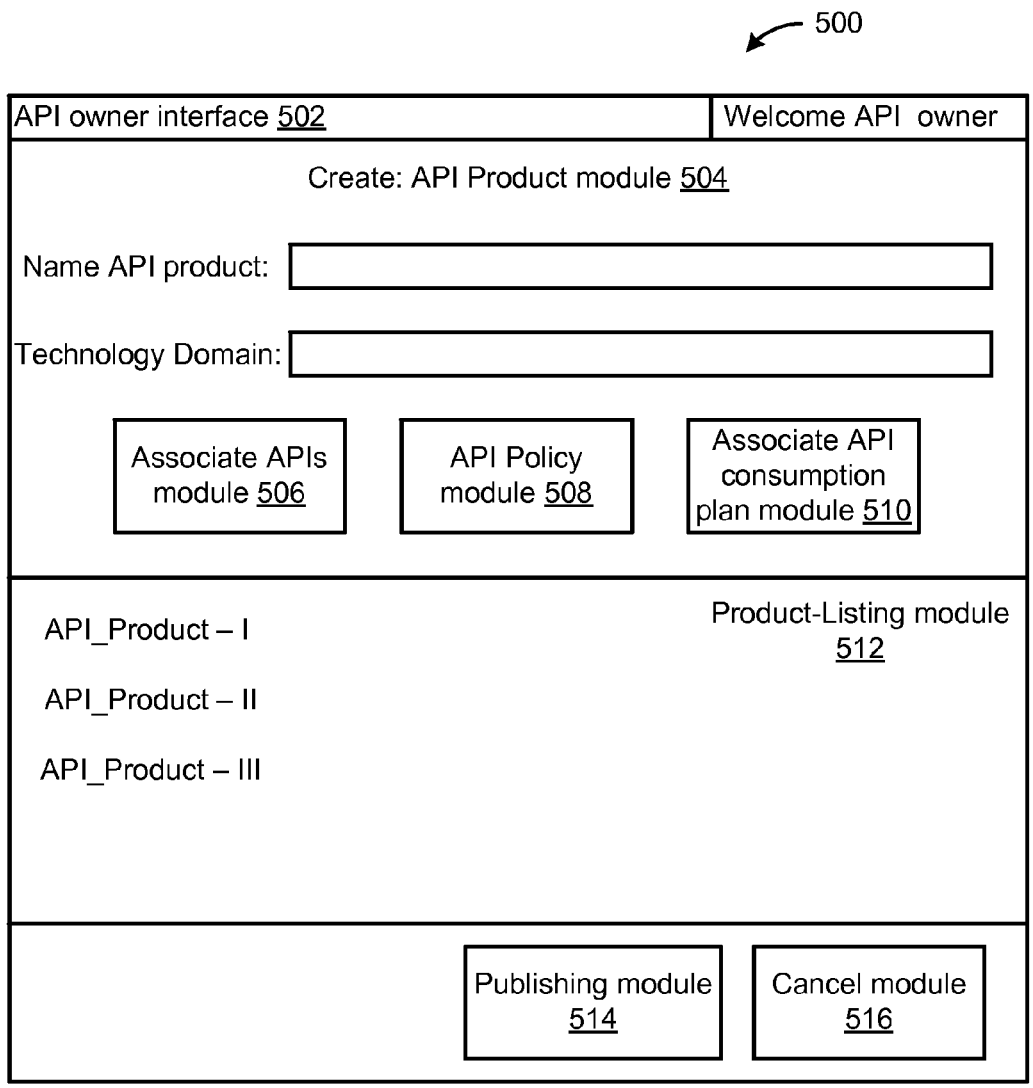
FIG. 5 is a block diagram illustrating an owner interface of an API management system, according to an embodiment.

FIG. 5 is a block diagram illustrating an exemplary API owner interface 502 associated with the API management system 500, according to an embodiment. In an embodiment, the API owner interface 502 may include functionality module such as create module 504, associate APIs module 506, API policy module 508, associate API consumption plan module 510, product-listing module 512, publishing module 514 and cancel module 516. Initially, to create API products, the API owner may access the create module 504. The create module 504 may be provided with one or more text boxes to show or receive information related to an API product such as name of the API product, technology domain of the API product and the like. The associate APIs module 506 may be accessed by the API owner to associate one or more APIs already stored into an API repository that is accessible by the API management system 500. Alternately, the API owner may also define new APIs and store them into the API repository.

The API policy module 508 enables the API owner to define API policies and to associate the same to the API product. In one embodiment, the API owner may select from a number of API policies stored in the API repository, and associate them to the created API product. The associate API consumption plan module 510 enables the API owner to associate an API consumption plan from a number of API consumption plans rendered on the owner interface 500. In an embodiment, when the API owner accesses the associate API consumption plan module 508, the API management system 500 coordinates with an integration agent to retrieve the API consumption plans from the API consumption plan store. The product-listing module 512 of the API owner interface 502, lists the API products published by the API owner. The API owner may publish the API product(s) by accessing the publishing module 514. Alternately, if the API owner wish to not to create/publish the created API product, may choose to opt out by accessing the cancel module 516.

Figure 6:
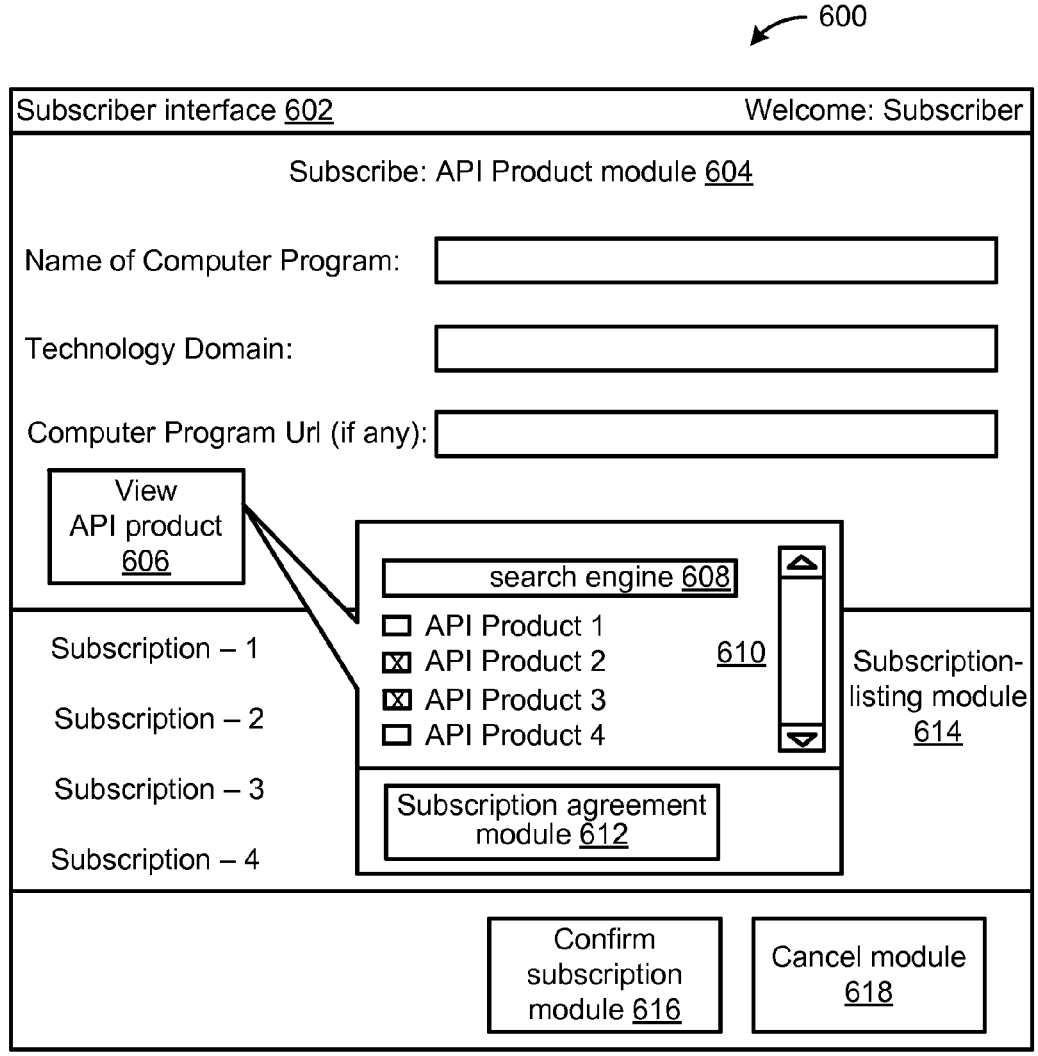
FIG. 6 is block diagram illustrating a subscriber interface of an API management system, according to an embodiment.

FIG. 6 is block diagram illustrating an exemplary subscriber interface 602 of the API management system 600, according to an embodiment. The subscriber interface 602 may include functionality modules such as API product module 604, view API product module 606, search module 608, API product listing module 610, subscription agreement module 612, subscription-listing module 614, confirm subscription module 616 and cancel module 618. The subscriber may access the subscribe module 604 to subscribe to API products for developing a computer program. At the subscribe module 604, the subscriber may provide information related to the computer program that he wishes to create such as name of the computer program, technology domain, computer program (if any) and the like. The subscriber may access the view API product module 606 to view the API products published on the subscriber interface 602 of the API management system 600. Upon accessing the view API product module 606, the subscriber may search for API products by providing appropriate search key words at the search engine 608. A plurality of API products are rendered on the API product listing module 610 based on the search key words submitted by the subscriber. The subscriber may select one or more API products by checking the boxes corresponding to an API product as illustrated. The subscriber may scroll up or down to view all the API products rendered. After selecting the appropriate API products, the subscriber may accept a subscription agreement which may be accessed at the subscription agreement module 612. The subscriptions purchased by the subscriber are listed on the subscription listing module 614. The subscriber may confirm the subscription purchased, by accessing the confirm subscription module 616. Alternately, if the subscriber does not want to purchase the subscription of the selected API product(s), may choose to opt out by accessing the cancel module 618.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
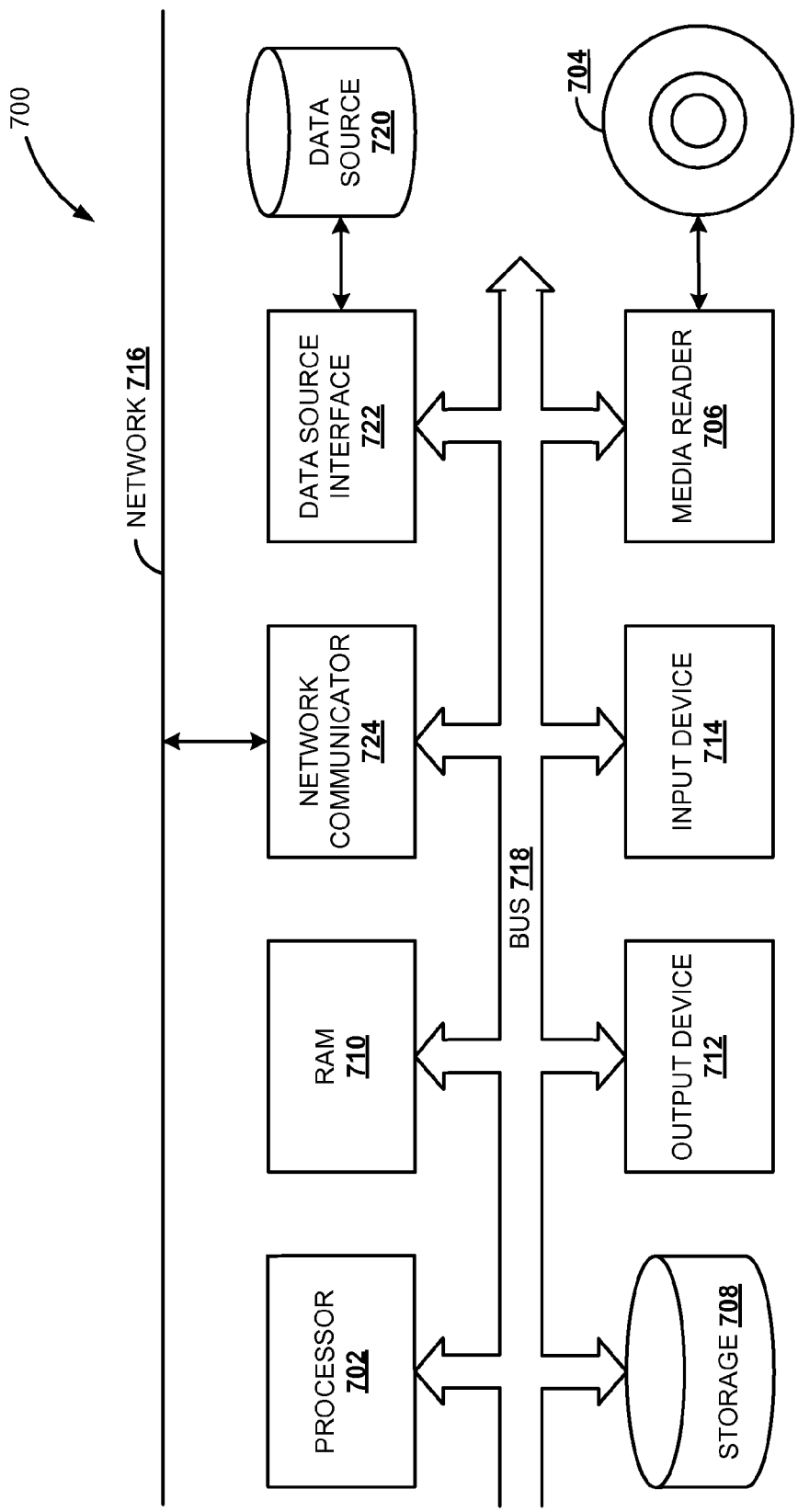
FIG. 7 is a block diagram illustrating a computing environment, according to an embodiment.

FIG. 7 is a block diagram of an exemplary system 700, according to one embodiment. The computer system 700 includes a processor 702 that executes software instructions or code stored on a computer readable storage medium 704 to perform the above-illustrated methods. The processor 702 can include a plurality of cores. The computer system 700 includes a media reader 706 to read the instructions from the computer readable storage medium 704 and store the instructions in storage 708 or in random access memory (RAM) 710. The storage 708 provides a large space for keeping static data where at least some instructions could be stored for later execution. According to some embodiments, such as some in-memory computing system embodiments, the RAM 710 can have sufficient storage capacity to store much of the data required for processing in the RAM 710 instead of in the storage 708. In some embodiments, all of the data required for processing may be stored in the RAM 710. The stored instructions may be further compiled to generate other representations of the instructions and dynamically stored in the RAM 710. The processor 702 reads instructions from the RAM 710 and performs actions as instructed. According to one embodiment, the computer system 700 further includes an output device 712 (e.g., a display) to provide at least some of the results of the execution as output including, but not limited to, visual information to users and an input device 714 to provide a user or another device with means for entering data and/or otherwise interact with the computer system 700. Each of these output devices 712 and input devices 714 could be joined by one or more additional peripherals to further expand the capabilities of the computer system 700. A network communicator 724 may be provided to connect the computer system 700 to a network 716 and in turn to other devices connected to the network 716 including other clients, servers, data stores, interfaces, for instance. The modules of the computer system 700 are interconnected via a bus 718. Computer system 700 includes a data source interface 722 to access data source 720. The data source 720 can be accessed via one or more abstraction layers implemented in hardware or software. For example, the data source 720 may be accessed by network 712. In some embodiments the data source 720 may be accessed via an abstraction layer, such as, a semantic layer.

A data source is an information resource. Data sources include sources of data that enable data storage and retrieval. Data sources may include databases, such as, relational, transactional, hierarchical, and multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated. The above descriptions and illustrations of embodiments, including what is described in the Abstract, is not intended to be exhaustive or to limit the one or more. Embodiments to the precise forms are disclosed. While specific embodiments are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

The invention claimed is:

1. A computer-implemented method for computing consumption of application programming interfaces (APIs), the method comprising:
   receiving a subscription request to an API product from an API management system;
   determining a consumption policy associated with the subscribed to API product, from a plurality of stored consumption policies, wherein the consumption policy includes a plurality of pre-defined policies mapped with a plurality of API consumption plans;
   identifying an API consumption plan associated with the determined consumption policy from the plurality of API consumption plans;
   computing consumption data for the subscribed to API product based on the identified API consumption plan, wherein computing the consumption data, includes:
     monitoring an API access request received to access the subscribed to API product;
     based on the monitoring, retrieving API consumption information related to the subscribed to API product, wherein the consumption information corresponds to a plurality of API consumption parameters defined in the API consumption plan;
     computing API consumption data based on the retrieved API consumption information; and
   identifying a charge plan associated with the subscribed to API product, comprising:
     identifying the API consumption plan as a post-paid plan;

retrieving the API consumption information associated with the plurality of API consumption parameters defined in the API consumption plan;

generating a plurality of aggregated consumable items by mapping the consumable items corresponding to the received API access request with the identified API consumption policy;

identifying a consumption-limit associated with a subscriber account;

comparing the aggregated consumable items associated with the identified consumption-limit associated with the subscriber account from a API management system;

upon determining that the aggregated consumable items are below the consumption-limit of the subscriber account, receiving the API access request corresponding to the subscribed to API product; and upon determining that the aggregated consumable items are above the consumption-limit of the subscriber account, rejecting the API access request corresponding to the subscribed to API product.

2. The computer implemented method according to claim 1, wherein computing the API consumption information of the subscribed to API product includes:

determining a consumable item and a non-consumable item corresponding to the subscribed to API product based on the identified API consumption plan, wherein the consumable item is a paid item and the non-consumable item is a free item, and wherein a charge for the consumable item is computed based on the identified API consumption plan associated with the subscribed to API product.

3. The computer implemented method according to claim 1, wherein identifying the API consumption plan associated with the subscribed to API product further, comprises:

fetching a plurality of aggregated consumable items and a plurality of non-aggregated consumable items corresponding to the API consumption information for the subscribed to API product, wherein the aggregated consumable items indicate an aggregated charge of the consumable items and the non-aggregated consumable items indicate a non-aggregated charge of the consumable items.

4. The computer implemented method according to claim 1, wherein identifying the API consumption plan associated with the subscribed to API product further, comprises:

identifying the API consumption plan as a prepaid plan;

retrieving the API consumption information with respect to the plurality of API consumption parameters defined in the API consumption plan;

identifying a minimum required balance from the identified API consumption plan for receiving the API access request;

determining whether the minimum required balance is available in a subscriber account;

upon determining that the required balance is available in the subscriber account, receiving the API access request corresponding to the subscribed to API product; and upon determining that the required balance is not available in the subscriber account, rejecting the API access request corresponding to the subscribed to API product.

5. The computer implemented method according to claim 1, wherein the method further comprises:

in response to the subscription request, retrieving an API subscription agreement associated with an API owner of the subscribed to API product, wherein the API subscription agreement defines legally binding conditions for a subscriber;

receiving an acceptance of the retrieved API subscription agreement corresponding to the subscription request; and based on the received acceptance, identifying a subscriber information of the subscriber and an API owner information of the subscribed to API product from a plurality of subscriber records and API owner records.

6. The computer implemented method according to claim 1, wherein the method further comprises:

receiving a create request for creating an API product;

in response to receiving the create request, receiving a policy defining request to define API related pre-defined policies for the API product;

storing the pre-defined policies related to API product;

selecting a set of pre-defined policies, wherein the selected set of the pre-defined policies corresponds to the API product;

selecting an API consumption plan;

generating a plurality of consumption policies by mapping the selected set of pre-defined policies to the selected API consumption plan;

storing the plurality of consumption policies related to a plurality of APIs associated with the API product;

associating the API product with the plurality of consumption policies; and publishing the API product.

7. The computer implemented method according to claim 6, wherein publishing the API product further, comprises:

receiving an agreement defining request corresponding to the published API product; and storing the agreement corresponding to the API product corresponding to the API owner.

8. A computer system for computing consumption of application programming interfaces (APIs), the system comprising:

a memory to store a program code;

a processor communicatively coupled to the memory, the processor configured to execute the program code to:

at an integration agent:

receive a subscription request from an API management system for subscribing to an API product;

determine a consumption policy associated with the subscribed to API product, from a plurality of consumption policies received from the API management system, wherein the consumption policy includes a plurality of pre-defined policies mapped with a plurality of API consumption plans;

identify an API consumption plan associated with the determined consumption policy, from the plurality of API consumption plans stored in an API consumption plan store;

compute a consumption data for the subscribed to API product based on the identified API consumption plan, wherein the computation of the consumption data includes:

monitor an API access request received at the integration agent, to access the subscribed to API product;

based on the API access request monitored, retrieve an API consumption information from consumption data related to the subscribed to API product, wherein the consumption data corresponding to a plurality of API consumption parameters defined in the identified API consumption plan is retrieved;

compute an API consumption data based on the retrieved API consumption information; and identify a charge plan associated with the subscribed to API product, comprising:

identifying the API consumption plan as a postpaid plan;

retrieving the API consumption information associated with the plurality of API consumption parameters defined in the API consumption plan;

generating a plurality of aggregated consumable items by mapping the consumable items corresponding to the received API access request with the identified API consumption policy;

identifying a consumption-limit associated with a subscriber account;

comparing the aggregated consumable items associated with the identified consumption-limit associated with the subscriber account from a API management system;

upon determining that the aggregated consumable items are below the consumption-limit of the subscriber account, receiving the API access request corresponding to the subscribed to API product; and upon determining that the aggregated consumable items are above the consumption-limit of the subscriber account, rejecting the API access request corresponding to the subscribed to API product.

9. The computer system according to claim 8, wherein the processor executes the program code to:

determine, at the integration agent, a consumable item and a non-consumable item corresponding to the subscribed to API product based on the identified API consumption plan, wherein the consumable item is a paid item and the non-consumable item is a free item, and wherein a charge for the consumable item is computed based on the identified API consumption plan associated with the subscribed to API product.

10. The computer system according to claim 9, wherein the processor executes the program code to:

in response to the subscription request, retrieve an API subscription agreement associated with an API owner of the subscribed to API product from a customer relationship management (CRM) system, wherein the API subscription agreement defines legally binding conditions for a subscriber;

receive an acceptance of the retrieved API subscription agreement corresponding to the subscription request from the API management system; and based on the received acceptance, identify a subscriber information of the subscriber and an API owner information of an API owner of the subscribed to API product from a plurality of subscriber records and API owner records stored in the CRM system.

11. The computer system according to claim 8, wherein the processor executes the program code to:

identify the API consumption plan as a prepaid plan;

retrieve, at the integration agent, the API consumption information with respect to the plurality of API consumption parameters defined in the API consumption plan;

identify, at the integration agent, a minimum required balance from the identified API consumption plan for receive the API access request from the API consumption plan store;

determine, at the integration agent, whether the minimum required balance is available in the subscriber account received from a customer relationship management (CRM) system;

upon determining that the required balance is available in the subscriber account, receive, at the integration agent, the API access request corresponding to the subscribed to API product from the API management system; and upon determining that the required balance is not available in the subscriber account, rejecting, at the integration agent, the API access request corresponding to the subscribed to API product from the API management system.

12. A non-transitory computer readable storage medium tangibly storing instructions, which when executed by a computer, cause the computer to:

receive, at an integration agent, a subscription request from an API management system for subscribing to an API product;

determine, at the integration agent, a consumption policy associated with the subscribed to API product, from a plurality of consumption policies received from the API management system, wherein the consumption policy includes a plurality of pre-defined policies mapped with a plurality of API consumption plans;

identify, at the integration agent, an API consumption plan associated with the determined consumption policy, from the plurality of API consumption plans stored in an API consumption plan store; and compute, at the integration agent, a consumption data for the subscribed to API product based on the identified API consumption plan, wherein the computation of the consumption data includes:

monitor an API access request received at the integration agent, to access the subscribed to API product;

based on the API access request monitored, retrieve at the integration agent, an API consumption information from consumption data related to the subscribed to API product, wherein the consumption data corresponding to a plurality of API consumption parameters defined in the identified API consumption plan is retrieved;

compute, at the integration agent, an API consumption data based on the retrieved API consumption information; and identify, at the integration agent, a charge plan associated with the subscribed to API product, comprising:

identifying the API consumption plan as a post-paid plan;

retrieving the API consumption information associated with the plurality of API consumption parameters defined in the API consumption plan;

generating a plurality of aggregated consumable items by mapping the consumable items corresponding to the received API access request with the identified API consumption policy;

identifying a consumption-limit associated with a subscriber account;

comparing the aggregated consumable items associated with the identified consumption-limit associated with the subscriber account from a API management system;

upon determining that the aggregated consumable items are below the consumption-limit of the subscriber account, receiving the API access request corresponding to the subscribed to API product; and upon determining that the aggregated consumable items are above the consumption-limit of the subscriber account, rejecting the API access request corresponding to the subscribed to API product.

13. The non-transitory computer readable medium according to claim 12, further comprising instructions which when executed by the computer, further causes the computer to:

determine, at the integration agent, a consumable item and a non-consumable item corresponding to the subscribed to API product based on the identified API consumption plan, wherein the consumable item is a paid item and the non-consumable item is a free item, and wherein a charge for the consumable item is computed based on the identified API consumption plan associated with the subscribed to API product.

14. The non-transitory computer readable medium according to claim 12, further comprising instructions which when executed by the computer further causes the computer to:

identify the API consumption plan as a prepaid plan;

retrieve, at the integration agent, the API consumption information with respect to the plurality of API consumption parameters defined in the API consumption plan;

identify, at the integration agent, a minimum required balance from the identified API consumption plan for receive the API access request from the API consumption plan store;

determine, at the integration agent, whether the minimum required balance is available in the subscriber account received from a customer relationship management (CRM) system;

upon determine that the required balance is available in the subscriber account, receive, at the integration agent, the API access request corresponding to the subscribed to API product from the API management system; and upon determining that the required balance is not available in the subscriber account, rejecting, at the integration agent, the API access request corresponding to the subscribed to API product from the API management system.

15. The non-transitory computer readable medium according to claim 12, further comprising instructions which when executed by the computer further causes the computer to in response to the subscription request, retrieve, at the integration agent, an API subscription agreement associated with an API owner of the subscribed to API product from a customer relationship management (CRM) system, wherein the API subscription agreement defines legally binding conditions for a subscriber;

receive, at the integration agent, an acceptance of the retrieved API subscription agreement corresponding to the subscription request from the API management system; and based on the received acceptance, identify, at the integration agent, a subscriber information of the subscriber and an API owner information of an API owner of the subscribed to API product, from a plurality of subscriber records and API owner records stored in the CRM system.

16. The non-transitory computer readable medium according to claim 12, further comprising instructions which when executed by the computer further causes the computer to:

receive, at an integration agent, receive, a create request for create an API product from the API management system;

in response to the create request received, receive, at the integration agent, a policy defining request to define API related pre-defined policies for the API product from the API management system;

store, at the integration agent, the pre-defined policies related to API product into the API management system;

select, at the integration agent, a set of pre-defined policies from the plurality of pre-defined policies stored in the API management system, wherein the selected set of the pre-defined policies corresponds to the API product;

retrieve, at the integration agent, an API consumption plan from the API consumption plan store;

generate, at the integration agent, a plurality of consumption policies by mapping the selected set of pre-defined policies to the retrieved API consumption plan;

store, at the integration agent, the plurality of consumption policies related to a plurality of APIs associated with the API product into the API management system;

associate, at the integration agent, the API product with the plurality of consumption policies at the API management system; and publish, at the integration agent, the API product on the API management system and the enterprise resource planning (ERP) system.

* * * * *